United States Patent [19]

Black

[11] 4,219,903
[45] Sep. 2, 1980

[54] BEARING RETAINER

[75] Inventor: John W. Black, Hickory Corners, Mich.

[73] Assignee: Pemco-Kalamazoo, Inc., Kalamazoo, Mich.

[21] Appl. No.: 930,873

[22] Filed: Aug. 3, 1978

Related U.S. Application Data

[63] Continuation of Ser. No. 767,152, Feb. 9, 1977, abandoned.

[51] Int. Cl.² .............................................. B60B 33/08
[52] U.S. Cl. ............................................ 16/21; 29/432
[58] Field of Search ........................... 16/18 R, 20-23; 308/188, 189 R, 190, 228, 230; 29/432

[56] References Cited
U.S. PATENT DOCUMENTS

| | | | |
|---|---|---|---|
| 1,157,666 | 10/1915 | Bennett | 29/432 X |
| 2,444,145 | 6/1948 | Rosan | 29/432 X |
| 3,142,085 | 7/1964 | Black | 16/18 R X |
| 3,157,942 | 11/1964 | MacLean | 29/432 |

FOREIGN PATENT DOCUMENTS 300874 8/1954 Switzerland ................................. 16/21

Primary Examiner—Louis Rimrodt
Attorney, Agent, or Firm—Blanchard, Flynn, Thiel, Boutell & Tanis

[57] ABSTRACT

An improvement in a bearing retainer construction for use with a bearing apparatus having a king pin for use with a swivel caster. The swivel caster has a swivel plate with a central opening therethrough. A pair of annular bearing ball retainers are disposed upon opposite sides of and spaced from the swivel plate. A plurality of bearing balls are disposed between the retainers on opposite sides of the swivel plate for snug rolling engagement with the retainers and with the swivel plate. The king pin is received in openings through the annular bearing ball retainers and has retaining structure thereon to prevent relative axial movement between the retainers and the king pin. A positive mechanical securement is provided between the pair of bearing ball retainers and the king pin to prevent a relative rotation between the bearing ball retainers and the king pin.

5 Claims, 9 Drawing Figures

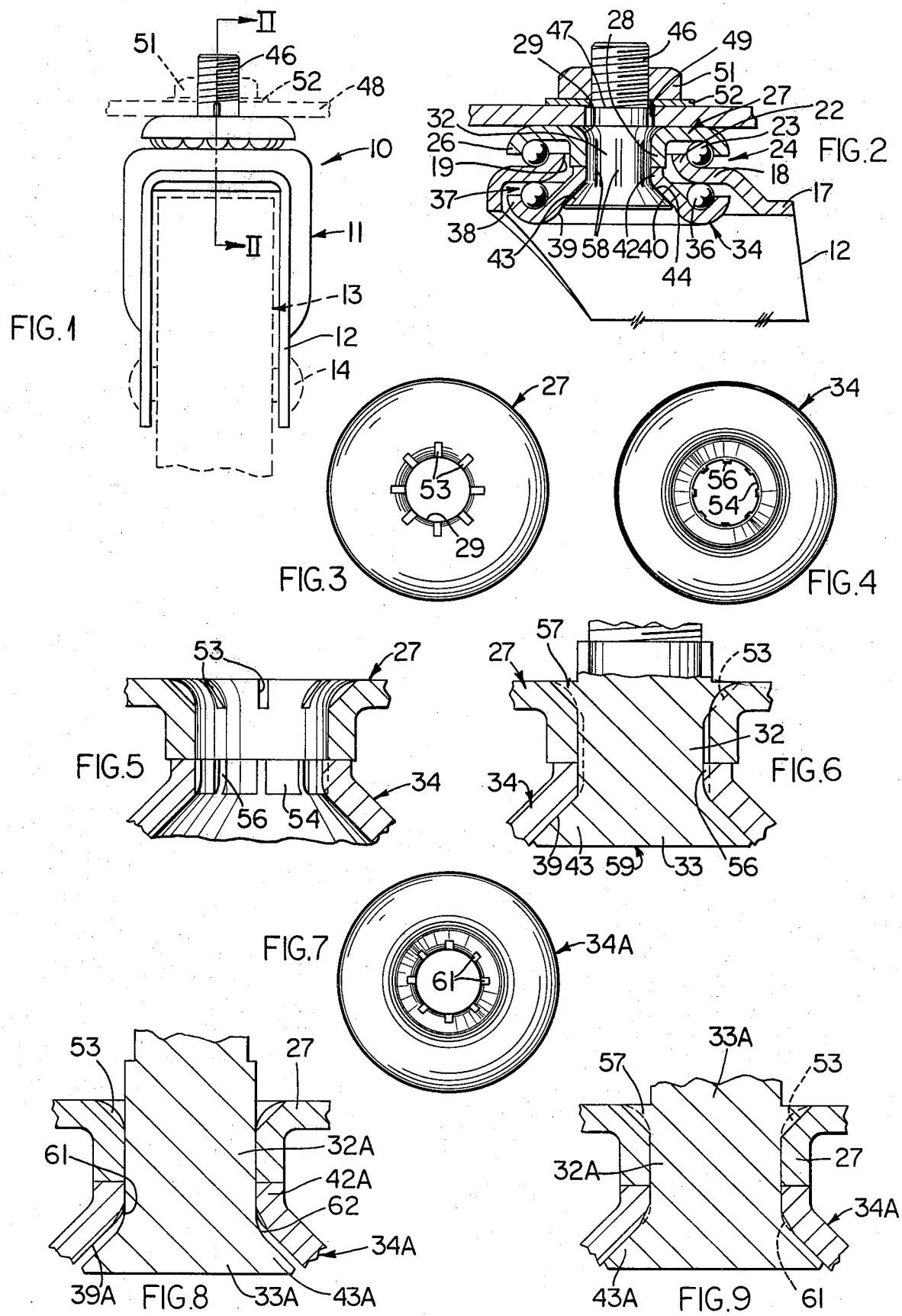

BEARING RETAINER

CROSS-REFERENCE TO RELATED APPLICATION

This is a continuation of application Ser. No. 767,152, filed Feb. 9, 1977, now abandoned.

FIELD OF THE INVENTION

This invention relates to an improvement in a bearing construction and, more particularly, to an improvement in the bearing ball retainer construction utilizable in the bearing construction and having a king pin extending therethrough and utilizable in a swivel caster environment of the type illustrated in U.S. Pat. No. 3,142,085.

BACKGROUND OF THE INVENTION

In bearing ball retainers of the type illustrated in U.S. Pat. No. 3,142,085, the swivel mechanism for the caster is subjected to frequent shock loads which result in the application of a sudden and oftentimes massive load to the bearing construction, particularly the bearing ball retainers. It is imperative that the bearing ball retainers remain axially aligned with each other so that the bearing balls movable in tracks provided thereon will continue to provide a rolling support for the swivel plate portion of the swivel caster. Heretofore, the swaging operation which effects a permanent deformation of a portion of the kind pin has provided a fractional coupling of the bearing ball retainers to the king pin. This mode of securing the bearing ball retainers to the king pin has been adequate and inexpensive to accomplish. However, it has been discovered that the bearing failure in the swivel caster mechanism is attributable directly to a loosening of the frictional coupling between the king pin and the bearing ball retainers.

Accordingly, it is an object of this invention to provide a positive mechanical connected between the bearing ball retainers and the king pin without effecting a destruction of the hardening characteristic of the bearing ball retainers and without substantially weakening the king pin construction.

It is a further object of this invention to provide the positive mechanical securement, as aforesaid, without altering the normal assembly procedure for the swivel caster set forth in U.S. Pat. No. 3,142,085.

SUMMARY OF THE INVENTION

The objects and purposes are met by providing an improved bearing ball retainer construction in a king pin and bearing apparatus for a swivel caster. The swivel caster has a swivel plate with a central opening therethrough. A pair of annular bearing ball retainers are disposed upon opposite sides of and spaced from the swivel plate. The retainers each have an annular and coaxial flange adjacent their inner edges and extends toward each other and firmly limits the movement of the retainers toward each other. One of the flanges has a substantially cylindrical portion and both of the flanges have portions defining openings having walls diverging away from the swivel plate. A plurality of bearing balls are disposed between the retainers on opposite sides of the swivel plate for snug rolling engagement with the retainers and the swivel plate. A king pin is provided which has a central portion snugly disposed within the flanges and the cylindrical portion. The king pin has a pair of spaced, annular flange portions near the opposite ends of the central portion. The flange portions each have outer surfaces converging toward each other and of substantially the same shape as and snugly received into the openings in the flanges on the retainers so that relative axial movement of the retainers is positively opposed. Positive mechanical securement structure is provided for positively and mechanically coupling the bearing ball retainers to the king pin to prevent a relative rotation between the bearing ball retainers and the king pin.

Other objects and purposes of this invention will be apparent to persons acquainted with apparatus of this general type upon reading the following specification and inspecting the accompanying drawing, in which:

FIG. 1 is a fragmentary, front elevational view of a swivel caster embodying my invention;

FIG. 2 is a sectional view taken along the line II—II in FIG. 1;

FIG. 3 is a top view of the upper bearing ball retainer;

FIG. 4 is a bottom view of the lower bearing ball retainer;

FIG. 5 is a fragmentary sectional view of the upper and lower bearing ball retainers with the king pin omitted therefrom;

FIG. 6 is a fragmentary sectional view similar to FIG. 5 but with the king pin shown extending through the opening in the bearing ball retainers;

FIG. 7 is a bottom view of a modified lower bearing ball retainer;

FIG. 8 is a fragmentary sectional view of the upper bearing ball retainer shown in FIGS. 3 and 5 combined with the modified lower bearing ball retainers and the king pin prior to mechanically coupling same to said bearing ball retainers; and FIG. 9 is a fragmentary sectional view similar to FIG. 8 but with the king pin mechanically coupled to the bearing ball retainers.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

The swivel mechanism 10 (FIG. 1), which has been selected to illustrate a preferred embodiment, is disclosed herein as part of a swivel caster 11 having a yoke or horn 12 upon which a caster wheel 13 is rotatably supported in a substantially conventional manner by means of a shaft 14. The yoke 12 has a swivel plate 17 with a circular, substantially flat portion 18 having a central opening 19 therethrough. The inner edge 22 of the central portion 18 defining the circular opening 19 is drawn upwardly to form an integral annular flange, the outer surface of which defines the inner face for the bearing balls 23 of the upper bearing 24.

The bearing balls 23 project upwardly above the flange 22 (FIG. 2) where they are engaged by the lower surface of the upper ball retainer 27 adjacent the downwardly extending, annular flange 26 on the outer edge of the retainer 27. The ball retainer 27 has an integral, downwardly extending flange 28 concentric with the outer flange 26 and substantially smaller in diameter than the diameter of the flange 22. The inner flange 28 is formed so that it defines an upwardly diverging, substantially conical opening 29 having a minimum diameter which is approximately the same as the outside diameter of the shank 32 of a king pin or spindle 33.

The swivel mechanism 10 (FIG. 2) includes a lower ball retainer 34 which supports the bearing balls 36 of the lower bearing 37 firmly against the lower surface of the central portion 18 on the swivel plate 17. The lower retainer 34 has an upwardly extending, integral flange 38 adjacent its outer edge which is an outer race for the balls 36. The retainer 34 also has an upwardly extending, inner flange 40 which is sufficiently close to the outer flange 38 to act as an inner race. The lower portion 39 of the flange 40 converges upwardly to define a downwardly facing, conical surface which extends upwardly approximately to the plane defined by the lower surface of the central portion 18, where the conical surface has an inside diameter approximately equal to the diameter of the shank 32 on the king pin 33. The flange 40 has a cylindrical portion 42 integral with and extending upwardly from the upper edge of the conical portion 39. The cylindrical portion 42 snugly embraces the shank 32 of the king pin 33 and the upper edge of the portion 42 engages the lower edge of the inner flange 28 approximately at the level of the upper edge of the flange 22 on the swivel plate 17.

The outer flanges 26 and 38 on the retaining rings 27 and 34, respectively, are preferably coaxial and of approximately the same diameter. The inner flange 28 of the retainer 27 and the cylindrical portion 42 of the retainer 34 have substantially equal inside diameters and they are coaxial. The inner flanges 28 and 42 are tightly held against each other when they are assembled with the bearing balls 23 and 36 on opposite sides of the swivel plate 17.

The king pin 33 (FIG. 2) has at or near its lower end an annular external flange 43 having a conical radial surface 44 with substantially the same downward divergence as the divergence of the inner surface of the conical portion 39 of the retainer 34. Thus, the conical radial surface 44 of the lower flange 43 is received into and snugly engages the conical portion 39 when the shank 32 extends through the cylindrical portion 42.

The shank 32 of the king pin 33 extends a short distance above the upper surface of the upper retainer 27. The king pin 33 has an externally threaded portion 46 of reduced diameter which forms a shoulder 47. As shown in FIG. 2, the threaded portion 46 of the king pin may be inserted through an appropriate opening 49 in a mounting plate 48 until the externally threaded portion 46 is exposed on the upper side thereof to facilitate the placement of a nut 51 and washer 52 to effect a securement of the swivel mechanism 10 to the mounting plate 48.

The construction set forth above is conventional and is discussed in greater detail in U.S. Pat. No. 3,142,085. The invention disclosed herein resides in the provision of an improved bearing ball retainer construction for effecting a mechanical interlock between the bearing ball retainers 27 and 34 and the king pin 33. More specifically, and referring to FIG. 3, the upper bearing ball retainer 27 has a plurality of serrations 53 provided around the opening through the central portion thereof, particularly on the conical portion 29. The lower bearing ball retainer 34 (FIG. 4) has a plurality of serrations 54 spaced around the inner surface of the integral portion 42. A plurality of ribs 56 are formed between the plurality of serrations 54.

During assembly of the bearing ball retainers 27 and 34, the bearing ball retainers are placed into a coaxial relation such as is illustrated in FIG. 5. Thereafter, the king pin is driven into a position extending through the central opening through the lower bearing ball retainer 34 to cause the ribs 56 to permanently deform portions of the shank portion 32 to thereby form scorings 58 on the external portion of the shank 32. As a result, and when the lower annular flange 43 engages the conical surface 39 on the lower bearing ball retainer 34, material 57 on the shank 32 is deformed into the serrations 53 to create a positive mechanical interlock between the bearing ball retainers 27 and 34 and the king pin 33.

In the modified embodiment of the lower bearing ball retainer 34A illustrated in FIGS. 7 to 9, a plurality of serrations 61 are provided on the surface between the integral portion 42A and the conical portion 39A. During assembly, an upward force is applied to the lowermost end 59 of the king pin 33A and, subsequently, material is deformed as at 57 (FIG. 9) into the serrations 53. The upward force applied to the king pin 33A will drive a portion of the material at the juncture between the lower annular flange 43A and the shank portion 32A, particularly the arced portion 62 into the serrations 61. As a result, a positive interlock is created between the king pin 33A and the upper and lower bearing ball retainers 27 and 34A.

The positive interlock between the bearing ball retainers and the king pin enhances the life of the bearing construction and renders the bearing construction capable of withstanding more and greater shock loads than the previously known bearing construction. In addition, the provision of specific structure on the bearing ball retainer and the cooperation of that structure with the king pin makes it possible to achieve a stronger connection between the bearing ball retainers and the king pin without altering the known assembly procedure described in U.S. Pat. No. 3,142,085, and without altering the strength of the king pin. As a result, the provision of this stronger connection between the bearing ball retainers and the king pin has produced a substantial improvement in the bearing construction without appreciably affecting the cost of producing the bearing construction.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege are defined as follows:

1. In a king pin and bearing construction for a swivel caster having a swivel plate with a central opening therethrough, comprising: first and second annular bearing ball retainers disposed upon opposite sides of and spaced from the swivel plate, said retainers having a cylindrical central opening therethrough and an annular and coaxial flange means adjacent their inner edges, said flange means extending toward each other and firmly limiting movement of said retainers toward each other, one of said flange means having a substantially cylindrical portion and both of said flange means having first means defining recesses therein with walls diverging away from the swivel plate disposed intermediate therebetween; a plurality of bearing balls disposed between said retainers on opposite sides of said swivel plate for snug rolling engagement with said retainers and said swivel plate; a king pin having a central cylindrical portion snugly disposed within said central opening in said flange means and said cylindrical portion, said king pin having second means defining a pair of integral and axially spaced, annular flange portions near the opposite ends of said central portion, said annular flange portions having tapered outer surfaces converging toward each other and of substantially the same shape as and snugly received into the recesses in said flange means, at least one of said annular flange portions being formed by deforming the material of said king pin during assembly of said bearing construction to said king pin, whereby relative axial movement of said first and second retainers is positively opposed by said pair of annular flange portions, the improvement comprising positive securement means for positively securing said first and second bearing ball retainers to said king pin to prevent a relative rotation between said bearing ball retainers and said king pin, said positive securement means including at least first serrations integrally provided on said walls of one of said recesses in one of said first and second bearing ball retainers, one of said annular flange portions on said king pin including second serrations integral therewith and in meshing engagement with said first serrations to positively interlockingly secure said one of said first and second bearing ball retainers to said king pin, said second serrations being formed in response to a deforming of the material of said king pin to form said one annular flange portion to thereby effect said positive securing of said first and second bearing ball retainers to said king pin.

2. The improved king pin and bearing construction according to claim 1, wherein said first bearing ball retainer has said first serrations and wherein said positive securement means also includes said second bearing ball retainer having plural integral ribs thereon which project radially into said opening therein; and wherein said positive securement means additionally includes the other of said annular flange portions on said king pin having third means defining a plurality of integral recesses therein receiving said ribs therein to positively interlockingly secure said second bearing ball retainer to said king pin, said integral recess being formed in response to said ribs engaging said other annular flange and deforming the material of said king pin simultaneous with said deforming of said material of said king pin to form said one annular flange.

3. The improved king pin and bearing construction according to claim 1, wherein both of said first and second bearing ball retainers having said serrations thereon; and wherein said pair of spaced, annular flange portions of said king pin each have third means integral therewith received in said serrations to positively interlockingly secure said first and second bearing ball retainers to said king pin, said third means being formed on said king pin in response to a deforming of the material of said king pin to form said one of said annular flange portions and simultaneously effect a compressing of said pair of annular flange portions into metal deforming interlocking engagement with said first and second bearing ball retainers.

4. In a method for assembling a swivel caster having a swivel plate with a central opening therethrough, first and second annular bearing ball retainers disposed upon opposite sides of and spaced from the swivel plate, said retainers having a central opening therethrough and an annular and coaxial flange means adjacent their inner edges, said flange means extending toward each other and firmly limiting movement of said retainers toward each other, one of said flange means having a substantially cylindrical portion and both of said flange means having first means defining recesses therein with walls diverging away from the swivel plate disposed intermediate therebetween; a plurality of bearing balls disposed between said retainers on opposite sides of said swivel plate for snug rolling engagement with said retainers and said swivel plate; a king pin having a central portion snugly disposed within said central opening in said flange means and said cylindrical portion, said king pin having second means defining a first annular flange portion near one end of the central portion, said first annular flange portion having a tapered outer surface converging toward said central portion and of substantially the same shape as and snugly received into one of said recesses in one of said flange means, the improvement comprising deforming a portion of the material of said king pin on an opposite end thereof from said one end into a second annular flange portion received in the other of said recesses so that axial movement of said first and second retainers is positively opposed by said first and second annular flange portions, said deformed material of said king pin flowing during the deforming process into serrations integrally provided on the walls of at least one of said first and second bearing ball retainers so that at least one of said first and second bearing ball retainers is positively secured to said king pin.

5. The improved method according to claim 4, wherein both of said first and second bearing ball retainers have serrations integrally provided on the walls thereof and wherein said deforming process includes the deforming of the material of said king pin into said serrations so that said first and second bearing ball retainers are positively secured to said king pin.

* * * * *